United States Patent
Kwon (10) Patent No.: US 12,459,431 B2
(45) Date of Patent: Nov. 4, 2025

(54) REAR WARNING SYSTEM FOR VEHICLE AND CONTROL METHOD THEREOF

(71) Applicant: HYUNDAI MOBIS CO., LTD., Seoul (KR)

(72) Inventor: Tae Min Kwon, Seosan-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 52 days.

(21) Appl. No.: 18/352,765

(22) Filed: Jul. 14, 2023

(65) Prior Publication Data

US 2024/0116438 A1    Apr. 11, 2024

(30) Foreign Application Priority Data

Oct. 5, 2022   (KR) .......................... 10-2022-0126976

(51) Int. Cl.
  *B60Q 1/00*    (2006.01)
  *B60Q 9/00*    (2006.01)
(52) U.S. Cl.
  CPC .................................. *B60Q 9/008* (2013.01)
(58) Field of Classification Search
  CPC . B60Q 9/008; B60W 30/18036; B60W 50/14; B60W 30/08; B60W 30/18154; B60W 40/02; B60W 2050/143; B60W 2420/403; B60W 2420/408; B60W 2420/54; B60W 2520/06
  USPC ....................................................... 340/456
  See application file for complete search history.

(56) References Cited

U.S. PATENT DOCUMENTS

| | | | | |
|---|---|---|---|---|
| 6,498,620 B2 * | 12/2002 | Schofield | ............... | B60Q 5/006 348/E7.086 |
| 9,493,170 B2 * | 11/2016 | Fletcher | ............ | B60W 30/0956 |
| 9,911,050 B2 * | 3/2018 | Lynam | ................. | G05D 1/0061 |
| 9,953,534 B1 * | 4/2018 | Malla | ...................... | G08G 1/163 |
| 2010/0201508 A1 * | 8/2010 | Green | ...................... | B60R 1/26 340/435 |
| 2012/0326917 A1 * | 12/2012 | Kiehne | ..................... | B60T 7/22 367/96 |

(Continued)

FOREIGN PATENT DOCUMENTS

| | | |
|---|---|---|
| KR | 10-2014-0020361 A | 2/2014 |
| KR | 10-2019-0012607 A | 2/2019 |
| KR | 10-2020-0072604 A | 6/2020 |

OTHER PUBLICATIONS

Korean Office Action issued on Jan. 20, 2025 in corresponding Korean Patent Application No. 10-2022-0126976. (5pages in Korean).

*Primary Examiner* — Tai T Nguyen
(74) *Attorney, Agent, or Firm* — NSIP Law (57) ABSTRACT

A rear warning system for a vehicle and a control method thereof are introduced, and the control method includes activating a rear cross-traffic collision prevention function, collecting, upon the activation of the rear cross-traffic collision prevention function being activated, road information between the vehicle and a target vehicle present in a rear or rear side of the vehicle using at least one of sensors installed in the vehicle, and controlling the rear cross-traffic collision prevention function based on a probability of intrusion of the target vehicle into an expected driving lane of the vehicle when the vehicle is reversing, the probability of intrusion being determined based on the collected road information.

10 Claims, 7 Drawing Sheets

(56) References Cited

U.S. PATENT DOCUMENTS

| | | | |
|---|---|---|---|
| 2013/0050491 A1* | 2/2013 | Lin | G06V 20/588 |
| | | | 348/148 |
| 2016/0114726 A1* | 4/2016 | Nagata | B60Q 9/007 |
| | | | 340/435 |
| 2020/0130680 A1* | 4/2020 | Cho | B60W 30/0953 |
| 2020/0398854 A1* | 12/2020 | Bae | B60W 30/18036 |
| 2021/0269055 A1* | 9/2021 | Kokido | B60W 50/16 |
| 2022/0118970 A1* | 4/2022 | Takaki | B60W 50/14 |
| 2022/0185309 A1* | 6/2022 | Kang | B60W 30/095 |
| 2023/0128234 A1* | 4/2023 | Okabe | G01S 13/08 |
| | | | 701/301 |

\* cited by examiner

REAR WARNING SYSTEM FOR VEHICLE AND CONTROL METHOD THEREOF

CROSS REFERENCE TO RELATED APPLICATION

This application claims the benefit under 35 U.S.C. § 119(a) of Korean Patent Application No. 10-2022-0126976, filed Oct. 5, 2022, in the Korean Intellectual Property Office, the entire disclosure of which is incorporated herein by reference for all purposes.

BACKGROUND

1. Field

The following description relates to a rear warning system for a vehicle and a control method thereof that prevents the rear cross-traffic collision prevention function from engaging in unnecessary warning alerts and collision prevention control when target vehicles are present in the rear or rear side of the vehicle during reversing.

2. Discussion of Related Art

With recent advancements in various sensors and recognition systems, the commercialization of Advanced Driver Assistance Systems (ADAS) is actively taking place in vehicles, considering the convenience and safety of drivers.

In particular, devices have been developed to address the safety of drivers and passengers proactively, and they are being installed and utilized in vehicles. These devices refer to active driving assistance systems designed to prevent accidents in advance, in contrast to passive safety devices that operate only after an accident has occurred.

Examples of such driver assistance systems include the rear cross-traffic collision warning (RCCW) system and the rear cross-traffic collision-avoidance assist (RCCA) system. The rear cross-traffic collision warning system refers to a system that detects target vehicles approaching from the rear sides of the vehicle during reversing and provides an advance warning. The rear cross-traffic collision-avoidance assist system refers to a system that detects target vehicles approaching from the rear side direction of the vehicle during reversing, and applies the brakes when a collision risk with the target vehicle is detected.

To detect surrounding objects or target vehicles using driver assistance systems as such, radar sensors can be installed in the rear of the vehicle, as mentioned above. Radar sensors detect target vehicles and objects within the sensor's detection range (FOV: Field of View) using radio waves. However, using only radar sensors to detect target vehicles in the rear can cause unnecessary warnings and control that could lead to driver discomfort in certain situations, such as when there is no possibility of a collision with the detected target vehicle to occur.

The foregoing is intended merely to aid in the understanding of the background of the present disclosure, and is not intended to mean that the present disclosure falls within the purview of the related art that is already known to those skilled in the art.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a processor-implemented method of controlling a rear warning system for a vehicle, the method including activating, at a collision prevention controller, a rear cross-traffic collision prevention function, collecting, upon the activation of the rear cross-traffic collision prevention function, road information between the vehicle and a target vehicle present in a rear or rear side of the vehicle using at least one sensor installed in the vehicle, determining a probability of intrusion of the target vehicle into an expected driving lane of the vehicle driven in reverse based on the collected road information, and controlling the rear cross-traffic collision prevention function based on the probability of intrusion, in response to the vehicle being in reverse.

The rear cross-traffic collision prevention function may be activated based on the vehicle being in reverse (R) state.

The at least one sensor may include one or more of a rear side radar, a rear ultrasonic sensor, a rear side ultrasonic sensor, a rear camera sensor, and a side camera sensor installed in the rear or rear side of the vehicle.

The road information may include one or more of information about the type of lane boundary line located between the target vehicle and the vehicle and information about the presence of road structures in the rear or rear side of the vehicle.

The collecting of the road information may include determining a driving direction of the expected driving lane of the vehicle in reverse and a driving direction of a lane on which the target vehicle is traveling.

The controlling of the rear cross-traffic collision prevention function may include deactivating warning alerts and collision prevention control, in response to determining the target vehicle does not intrude into the expected driving lane of the vehicle based on the collected road information.

In another general aspect, there is provided a rear warning system for a vehicle, the system including at least one sensor configured to collect road information between the vehicle and a target vehicle present in a rear or rear side of the vehicle, and a collision prevention controller configured to collect, based on a rear cross-traffic collision prevention function being activated, road information between the vehicle and the target vehicle using the at least one sensor, determine a probability of intrusion of the target vehicle into an expected driving lane of the vehicle driven in reverse based on the collected road information, and control the rear cross-traffic collision prevention function based on the probability of intrusion, in response to the vehicle being in reverse.

The collision prevention controller may be configured to activate, based on the vehicle being in a reverse (R) state, the rear collision prevention function.

The at least one sensor may include one or more of a rear side radar, a rear ultrasonic sensor, a rear side ultrasonic sensor, a rear camera sensor, and a side camera sensor installed in the rear or rear side of the vehicle.

The road information may include one or more of information about the type of a lane boundary line located between the target vehicle and the vehicle and information about the presence of road structures in the rear or rear side of the vehicle.

The collision prevention controller may be configured to determine a driving direction of the expected driving lane of the vehicle in reverse and a driving direction of a lane on which the target vehicle is traveling.

The collision prevention controller may be configured to deactivate warning alerts and collision prevention control, in response to determining the target vehicle does not intrude into the expected driving lane of the vehicle based on the collected road information.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

As used herein, terms including an ordinal number such as "first" and "second" can be used to describe various components without limiting the components. The terms are used only for distinguishing one component from another component.

It will be understood that when a component is referred to as being "connected to" or "coupled to" another component, it can be directly connected or coupled to the other component or intervening component may be present. In contrast, when a component is referred to as being "directly connected to" or "directly coupled to" another component, there are no intervening component present.

As used herein, the singular forms are intended to include the plural forms as well, unless the context clearly indicates otherwise.

It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Hereinafter, descriptions are made of the embodiments disclosed in the present specification with reference to the accompanying drawings in which the same reference numbers are assigned to refer to the same or like components and redundant description thereof is omitted.

In addition, a unit or control unit included in the names of a Motor Control Unit (VCU), a Hybrid Control Unit (HCU), etc. is only a term in use widely for designating a controller that controls a specific functions of a vehicle but does not means a generic function unit. For example, each controller may include a communication device communicating with another controller or sensor to control a function in charge, a memory that stores operating system or logic instructions and input/output information, and one or more processors for determination, operation, and decision-making necessary for functions in charge.

Figure 1:
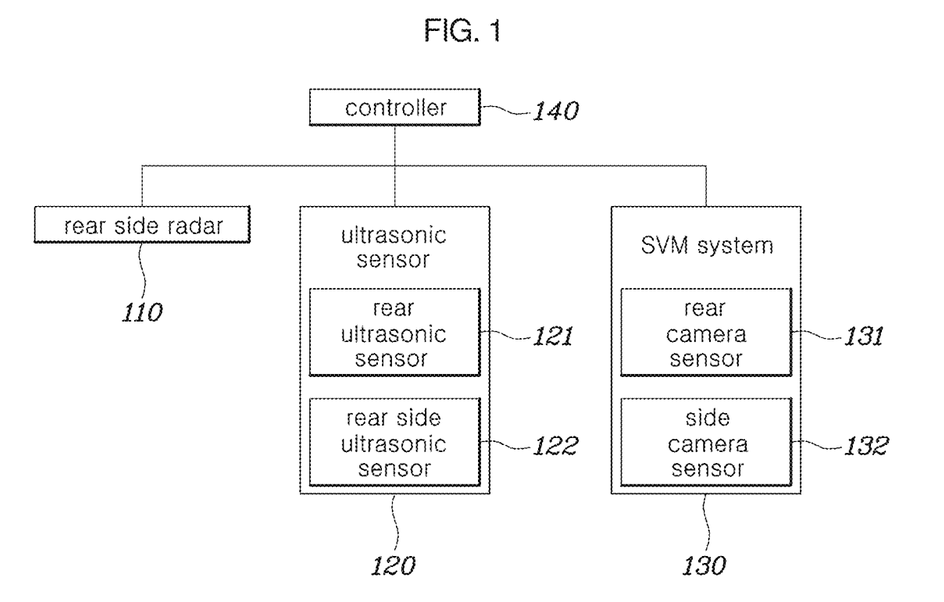
FIG. 1 is a block diagram of a rear warning system for a vehicle according to an embodiment of the present disclosure.

First, a description is made of the configuration of the rear warning system for a vehicle according to an embodiment with reference to FIG. 1.

FIG. 1 is a block diagram of a rear warning system for a vehicle according to an embodiment of the present disclosure.

With reference to FIG. 1, a rear warning system for a vehicle according to an embodiment may include a rear side radar 110, an ultrasonic sensor 120, a surround view monitor (SVM) system 130, and a controller 140. Also, the ultrasonic sensor 120 may include a rear ultrasonic sensor 121 and a rear side ultrasonic sensor 122, and the SVM system 130 may include a rear camera sensor 131 and a side camera sensor 132.

FIG. 1 shows components related to the present embodiment and it is obvious to be able to include fewer or more components in an actual implementation. Additionally, the rear side radar 110, the ultrasonic sensor 120, the SVM system 130, and the controller 140 may be configured to be able to communicate each other via communication lines based on a predetermined sensor communication protocol or vehicle communication protocol (e.g., Controller Area Network (CAN)).

Hereinafter, a description is made of each component.

When the vehicle is driving in reverse, the rear side radar 110 may recognize surrounding vehicles in the rear side of the vehicle and collect information thereabout. Examples of recognizing surrounding vehicles on the rear side using the rear side radar 110 are described with reference to FIGS. 2 to 5.

FIGS. 2 to 5 are diagrams illustrating the vehicle detecting a target vehicle during reversing according to an embodiment of the present disclosure.

Figure 2:
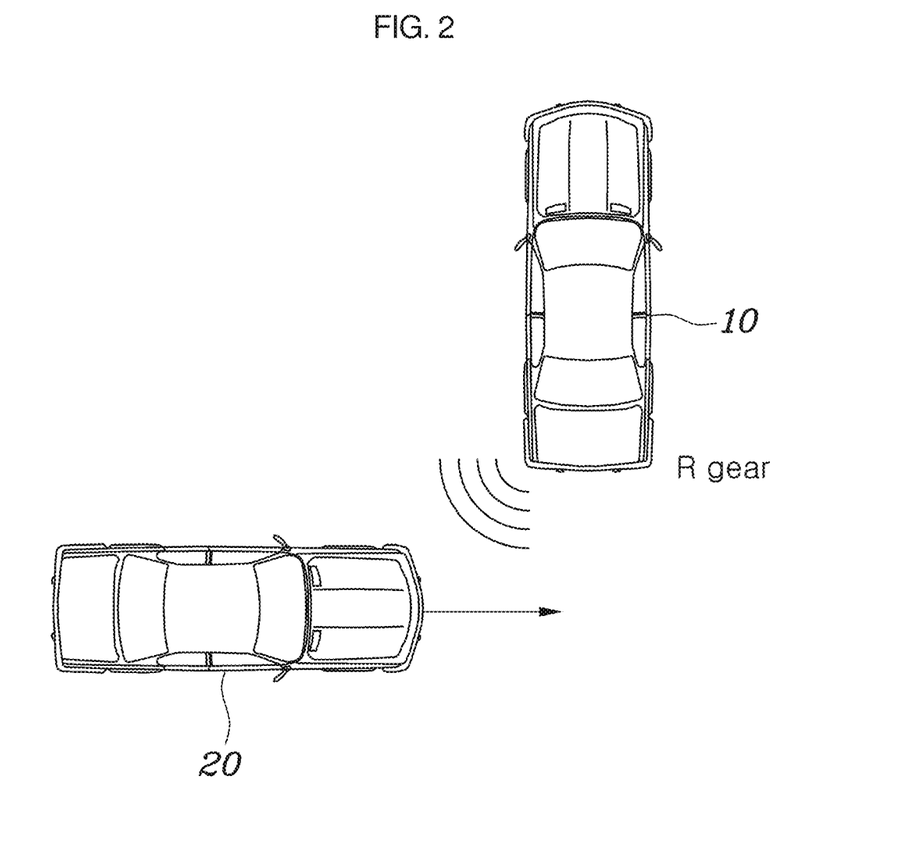
FIGS. 2 to 5 are diagrams illustrating the vehicle detecting a target vehicle during reversing according to an embodiment of the present disclosure.
Figure 3:
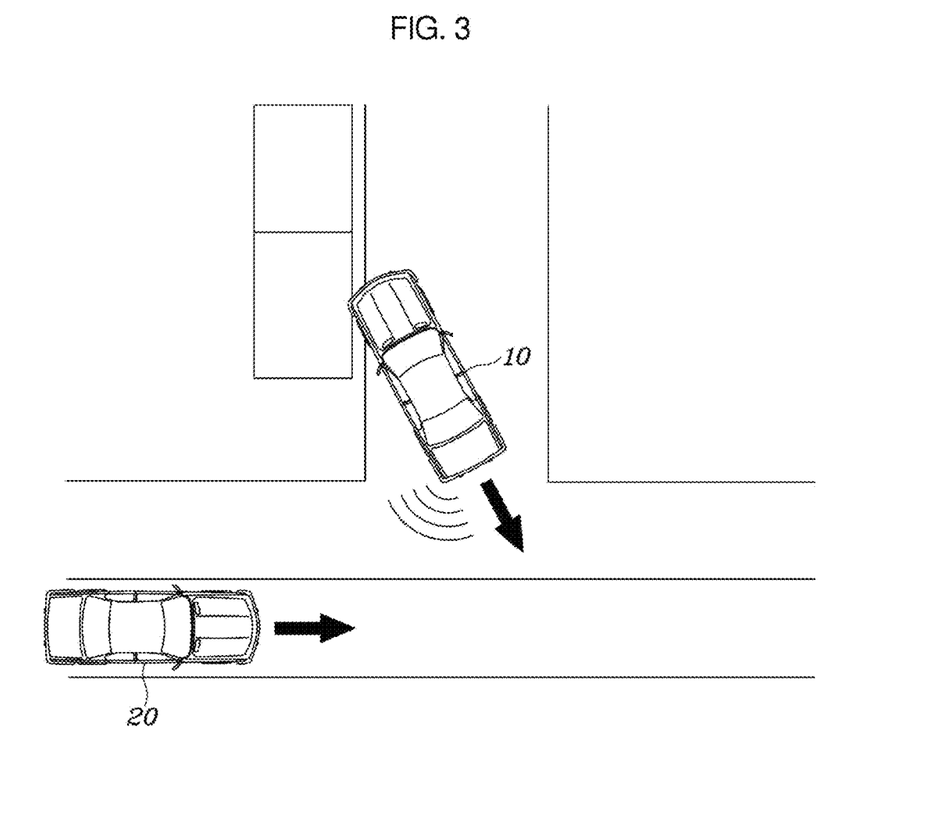
Figure 4:
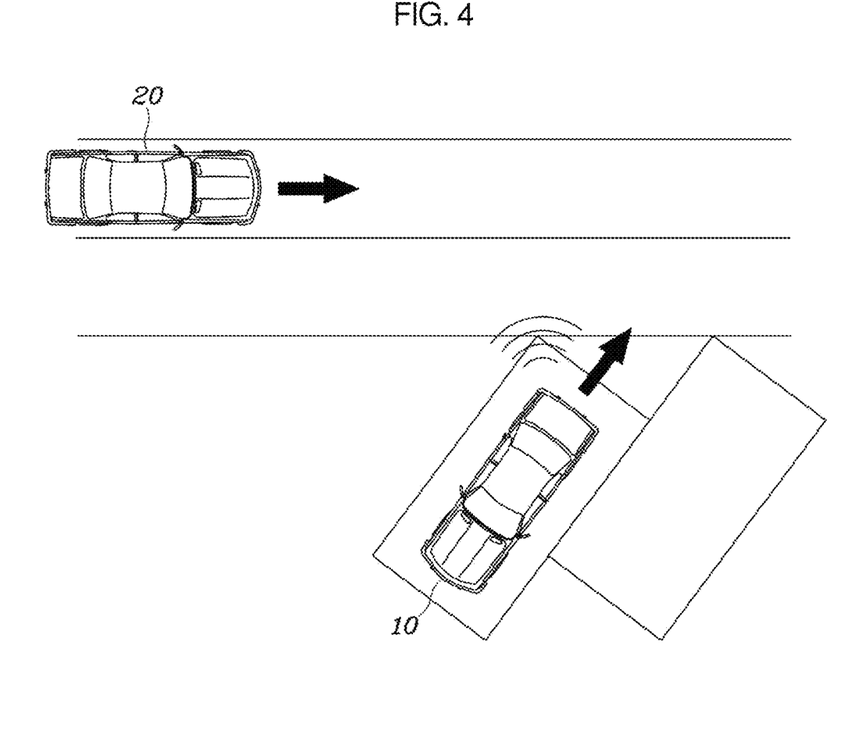
Figure 5:
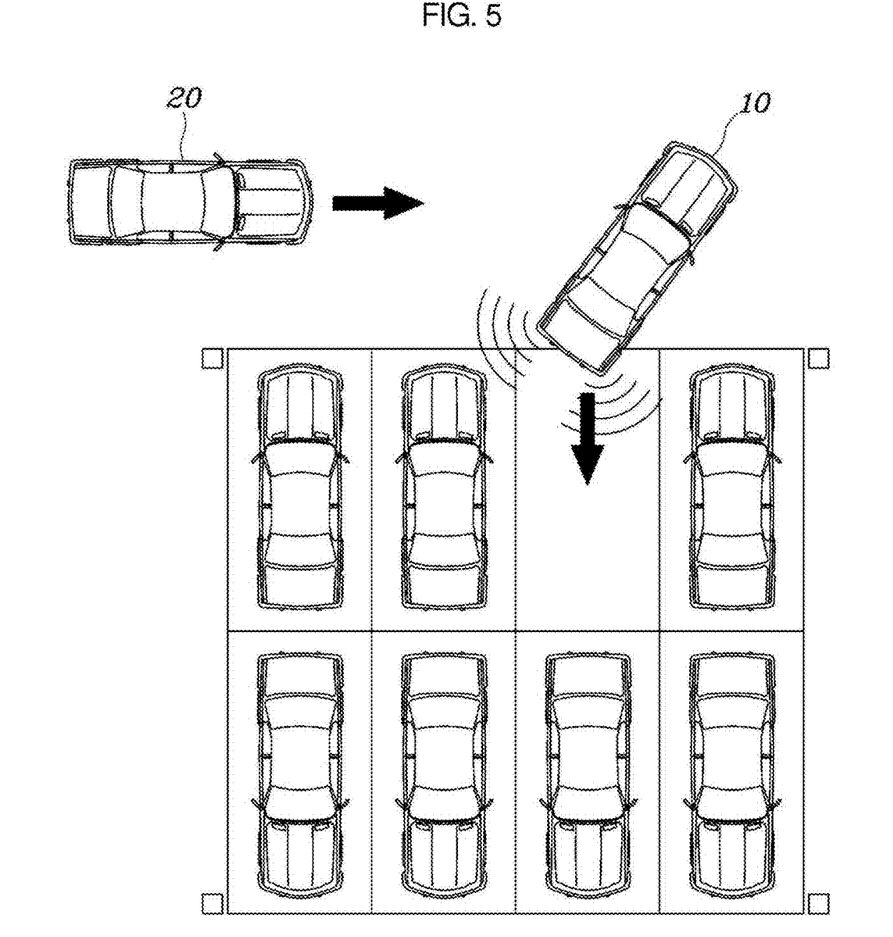

As shown in FIGS. 2 to 4, when the transmission is in the reverse (R) gear for the reverse operation of the vehicle 10, a collision prevention controller 600 (illustrated in FIG. 6) may execute instructions or software to activate the rear cross-traffic collision prevention function, and the rear side radar 110 may recognize a target vehicle 20 approaching from the rear or rear side of the vehicle 10. As shown in FIG. 5, even when the vehicle 10 is driving in reverse to park, the rear cross-traffic collision prevention function is activated, and the rear radar 110 may recognize target vehicles 20 approaching from the rear or rear side of the vehicle 10. The exemplary situations shown in FIGS. 2 to 5 are illustrative, and of course, there may be various situations other than those mentioned between the vehicle 10 and target vehicles 20 approaching from the rear or rear side of the vehicle 10.

With reference to FIGS. 2 to 5, the rear side radar 110 may be installed in the rear corner of the vehicle to monitor surrounding vehicles or objects in the rear side within the field of view (FOV) using radio waves. Here, the monitored results may be transmitted to the control unit 140 through CAN communication.

Meanwhile, with reference back to FIG. 1, the vehicle may be equipped with devices 120 and 130 that prioritize the driver's convenience and safety during parking operations. These devices 120 and 130 may be the ultrasonic sensor 120 and the SVM system 130, referred to as parking assist devices or parking assist sensors.

The ultrasonic sensor 120 may include a rear ultrasonic sensor 121 and a rear side ultrasonic sensor 122, and the SVM system 130 may include a rear camera sensor 131 and a side camera sensor 132. However, these are merely examples, and parking assist sensors are not limited to the aforementioned components. The rear ultrasonic sensor 121 and the rear side ultrasonic sensor 122 may collect reliable data on potential risks in the vehicle's immediate vicinity by transmitting ultrasound and collecting distance, thickness, and motion data based on the time difference between signals and surrounding objects.

Furthermore, by capturing the vehicle's lateral and rear surroundings with the rear camera sensor 131 and the side camera sensor 132 of the SVM system 130, the driver can check the surrounding space through a monitor installed inside the vehicle. The SVM system 130 may also collect data on nearby lane and road markers (such as directional arrows or text on the road) and clearance space by processing information from the rear camera sensor 131 and the side camera sensor 132. This is merely an example, and it is possible to collect data by processing information not only from the sensors 131 and 132 configured in the SVM system 130 but also from other sensors installed in the vehicle. In addition, the information or data collected through the ultrasonic sensor 120 and the SVM system 130 may be transmitted to the controller 140 via CAN communication.

The controller 140 may receive the information or data collected from the rear radar 110, the ultrasonic sensor 120, and the SVM system 130. In particular, when the vehicle is reversing, the controller 140 may receive information from the rear side radar 110, and when the vehicle is parking, it may receive information from the ultrasonic sensor 120 and SVM system 130. In implementation, the controller 140 may be implemented as one of the functions of the ADAS controller, controlling functions such as the rear cross-traffic collision warning (RCCW) system and the rear cross-traffic collision-avoidance assist (RCCA) system. However, this is just an example and is not necessarily limited thereto. For example, the controller 140 may be implemented as a separate controller different from the ADAS controller.

The controller 140 may also issue a warning alert via the Audio, Video, and Navigation (AVN, not show) or perform collision prevention control based on the received information when the vehicle 10 in motion is in a risk of collision with surrounding objects or target vehicles 20. In detail, when the vehicle's transmission is in the reverse gear (R), the functions of the blind-spot collision warning (BCW), rear cross-traffic collision warning (RCCW), and rear cross-traffic collision prevention assist (RCCA) may be activated among the advanced driver assistant system (ADAS) installed in the vehicle. When the rear cross-traffic collision warning and rear cross-traffic collision prevention assist functions (hereinafter referred to as the rear cross-traffic collision prevention function) of the vehicle are activated, the controller 140 may perform warning alerts or collision prevention control via the rear cross-traffic collision prevention function based on the information provided by the rear side radar 110.

The rear side radar 110 may provide information to the controller 140 to issue warning alerts when the target vehicle 20 satisfies the predetermined conditions for the entry angle. However, there is a problem in that false warning alerts are performed via the controller 140 due to misinterpretation that the target vehicle 20 satisfies the predetermined conditions for the entry angle based on the error of the rear side radar 110.

There is also a problem in that the rear side radar 110 detects the target vehicle 20 even when there is no risk of collision between the target vehicle 20 and the vehicle 10 in the rear or rear-side of the vehicle 10 during reverse driving, causing warning alerts or collision prevention control to be performed unnecessarily. Meanwhile, the present disclosure utilizes not only the rear side radar 110 but also the ultrasonic sensor 120 and SVM system 130 to control the warning alerts or collision prevention control via the rear cross-traffic collision prevention function in order to prevent false warnings or collision prevention control when there is no risk of collision with the target vehicle 20 during the vehicle's reverse driving. To this end, a collision prevention controller 600 for controlling the rear warning system of the vehicle is provided and described with reference to FIG. 6.

Figure 6:
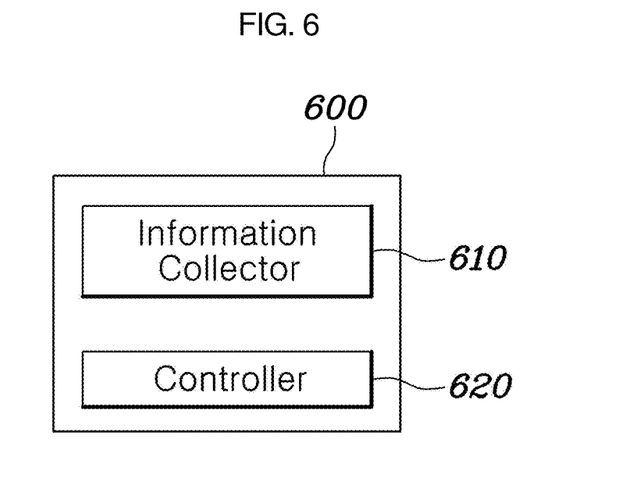
FIG. 6 is a block diagram of a collision prevention controller for controlling the rear warning system for a vehicle according to an embodiment of the present disclosure.

FIG. 6 is a block diagram of a collision prevention controller for controlling the rear warning system for a vehicle according to an embodiment of the present disclosure.

With reference to FIG. 6, the collision prevention controller 600 according to an embodiment of the present disclosure may collect road information between the target vehicle 20 and the vehicle 10 in the rear or rear side of the vehicle 10 during its reverse driving by using at least one of the sensors installed in the vehicle 10, determine the possibility of intrusion of the target vehicle 20 into the expected reverse driving path the vehicle 10 based on the collected road information, and control the rear cross-traffic collision prevention function based on the possibility of intrusion. For this purpose, the collision prevention controller 600 may include an information collector 610 (also referred to as information collection unit 610) and a controller 620 (also referred to as control unit 620).

In detail, when the transmission of the vehicle 10 is in the reverse gear (R), the collision prevention controller 600 may execute instructions or software to activate the rear cross-traffic collision prevention function, and the information collector 610 may collect road information between the target vehicle 20 and the vehicle 10 in the rear or rear side of the vehicle 10 by using at least one of the sensors installed in the vehicle 10. Here, the road information collected by the information collector 610 may include at least one of information about the type of lane located between the target vehicle 20 and the vehicle 10 in the rear or rear side of the vehicle 10 and information about the presence of road structures. In particular, the information about the type of lane may include information about the color of the lane located between the vehicle 10 and the target vehicle 20, and the information about road structures may include information about lane dividers such as barriers or guardrails located between the vehicle 10 and the target vehicle 20.

This is merely an example, and there may be various types of information regarding the lane type and road structures. The information collector 610 may provide at least one of the collected lane type information and information about the presence of road structures to the controller 620.

The controller 620 may prevent the rear cross-traffic collision prevention function from being performed when the target vehicle 20 is not able to intrude into the expected driving lane of the reversely driving vehicle 10 based on the information provided by the information collector 610. In addition, the controller 620 may determine the driving direction of the lane that the vehicle 10 enters reversely and the driving direction of the lane on which the target vehicle 20 is traveling based on the information provided by the information collector 610 or a separate device or sensor installed in the vehicle and, on the basis thereof, determine whether the target vehicle 20 can intrude into the expected driving path of the vehicle 10.

With reference to exemplary situations of FIGS. 3 and 4, when the lane boundary line between the vehicle 10 and the target vehicle 20 is a yellow solid line, the controller 620 may determine that the lane boundary line is the centerline, that the driving direction of the lane that the vehicle 10 is reversely entering is opposite to the driving direction of the lane in which the target vehicle 20 is traveling, and simultaneously that the target vehicle 20 cannot intrude into the expected driving lane of the vehicle 10. In addition, when there is a lane divider such as a barrier or guardrail between the vehicle 10 and the target vehicle 20, the controller 620 may determine that the driving direction of the vehicle 10 and the driving direction of the target vehicle 20 are opposite to each other and that the target vehicle 20 cannot intrude into the expected driving lane of the vehicle 10. Therefore, when the controller 620 determines that the target vehicle 20 cannot intrude into the expected driving lane of the vehicle 10 that is reversing, it may control the rear cross-traffic collision prevention function to deactivate the warning alerts and collision prevention control.

However, when the lane boundary line between the vehicle 10 and the target vehicle 20 is a white solid or dotted line or when there is no road structure such as a lane separator between the vehicle 10 and the target vehicle 20, this means that the target vehicle 20 may intrude into the expected driving lane of the vehicle 10, and thus the controller 620 may control the rear cross-traffic collision prevention function to perform the warning alerts and collision prevention control properly.

Furthermore, even though the driving direction of the expected driving lane that the vehicle 10 is entering and the driving direction of the target vehicle 20 are opposite to each other, when the lane boundary line between the vehicle 10 and the target vehicle 20 is a white dotted line that allows U-turns on the road where the target vehicle 20 is traveling, there is a possibility that the target vehicle 20 may intrude into the expected driving lane of the vehicle 10 and, in this case, the controller 620 may control the rear cross-traffic collision prevention function to perform the warning alerts and collision prevention control properly.

However, as shown in FIG. 5, even though the lane boundary line between the vehicle 10 and the target vehicle 20 is a white solid line, when the target vehicle 20 is entering a parking area and the vehicle 10 is reversing to park, the controller 620 may control the rear cross-traffic collision prevention function to deactivate warning alerts and collision prevention control because the target vehicle 20 cannot intrude into the reversing path of the vehicle 10.

Hereinafter, a description is made of the control method for the rear warning system of a vehicle according to an embodiment with reference to FIG. 7 on the basis of the configuration of the rear warning system of a vehicle described with reference to FIGS. 1 and 6. For convenience of explanation, it is assumed that the collision prevention controller 600 of FIG. 6 is implemented as a controller 140 in FIG. 7.

Figure 7:
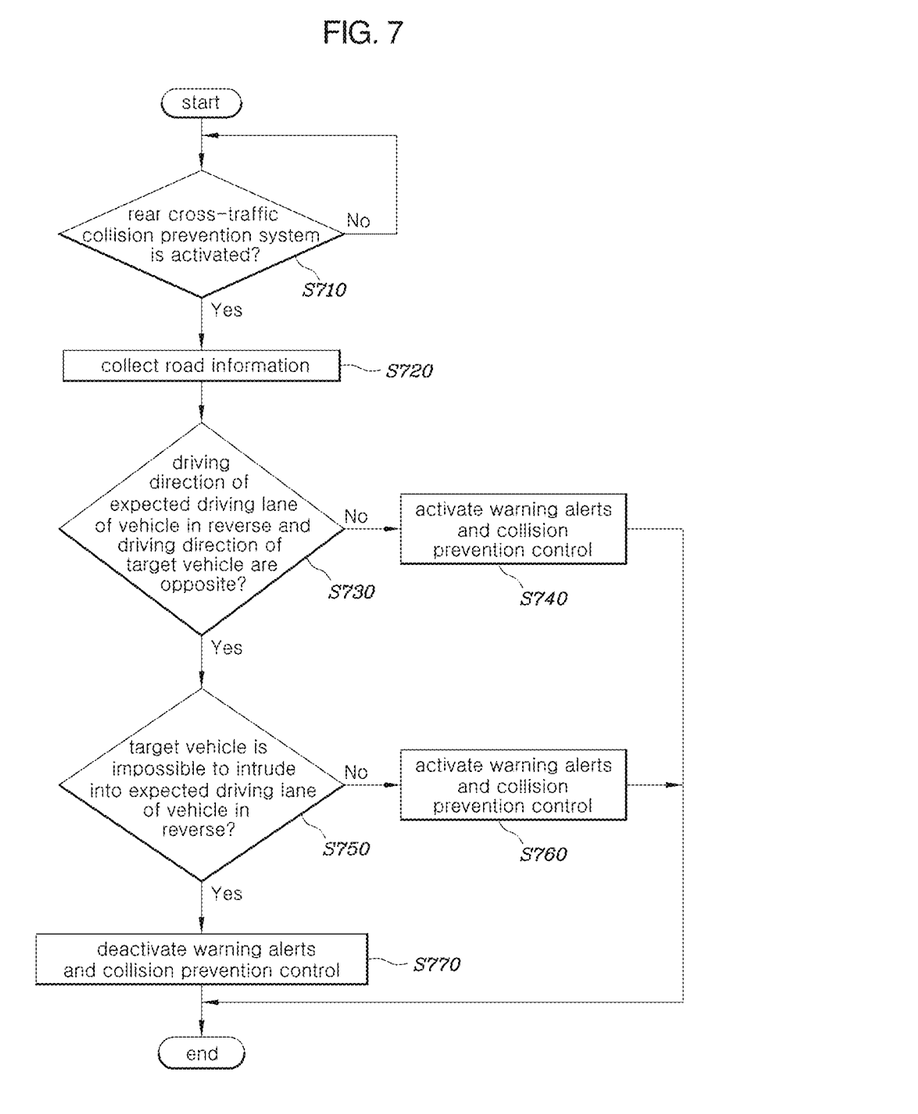
FIG. 7 is a flowchart of a method of controlling a rear warning system for a vehicle according to an embodiment of the present disclosure.

FIG. 7 is a flowchart of a control method for a rear warning system for a vehicle according to an embodiment of the present disclosure.

First, the controller 140 may determine at step S710 whether to activate the rear cross-traffic collision prevention function by checking the transmission of the vehicle 10. When it is determined to activate the rear cross-traffic collision prevention function (Yes at step S710) based on the transmission of the vehicle 10 being in the reverse gear (R) state, the controller 140 may collect, at step S720, road information between vehicle 10 and the target vehicle 20 spotted in the rear or rear side of the vehicle 10.

The controller 140 may determine whether to perform a warning alert based on whether the target vehicle 20 is possible to intrude into the expected driving lane of the vehicle 10, when the vehicle 10 is reversing, based on the collected road information.

For example, the controller 140 may determine at step S730 whether the driving direction of the expected driving lane that the vehicle 10 entering in reverse and the driving direction of the target vehicle 20 are opposite to each other based on the collected road information. When the driving direction of the expected driving lane that the vehicle 10 enters in reverse and the driving direction of the target vehicle 20 are the same (No at step S730), this means that the target vehicle 20 may intrude into the expected driving lane of the vehicle 10, and the rear cross-traffic collision prevention function may be maintained in the activated state to perform a warning alert and collision prevention control at step S740

In addition, even though the driving direction of the expected driving lane that the vehicle 10 is entering in reverse and the driving direction of the target vehicle 20 are opposite to each other (Yes at step S730), when it is determined that the target vehicle 20 is possible to intrude into the expected driving lane of the reversing vehicle 10 (No at step S750) based on the collected road information, the controller 140 may maintain the activated state of the rear cross-traffic collision prevention function to perform warning alerts and collision prevention control at step S760.

However, when the target vehicle 20 cannot intrude into the expected driving lane that the vehicle 10 is entering in reverse (Yes at step S750), the controller 140 may control the rear cross-traffic collision prevention function to deactivate warning alerts and collision prevention control at step S770. When the target vehicle 20 cannot intrude into the expected driving lane of the vehicle 10, the controller 140 may control the rear cross-traffic collision prevention function to prevent unnecessary warning alerts or collision prevention control while the vehicle 10 is reversing, which can alleviate the driver's discomfort.

Meanwhile, the intrusion determination step S750 may be omitted according to the embodiment.

As described above, the rear warning system for a vehicle and control method thereof prevents unnecessary warning alerts and collision prevention control of the rear cross-traffic collision prevention function when it is determined that there is no possibility of the target vehicle invading the expected driving path of the vehicle based on the road information between the target vehicle present in the rear or rear side of the vehicle during reversing, thereby reducing driver discomfort and increasing the reliability of the warning and control system.

The rear cross-traffic collision preventor, the collision prevention controller 600, the information collector 610, the controller 620, and the other computing apparatuses, the electronic devices, the processors, the units, the memories, and other components described herein are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in the figures that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-Res, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of controlling a rear warning system for a vehicle, the method comprising:
   activating, at a collision prevention controller, a rear cross-traffic collision prevention function;
   collecting, upon the activation of the rear cross-traffic collision prevention function, road information between the vehicle and a target vehicle present in a rear or rear side of the vehicle using at least one sensor installed in the vehicle;
   determining a probability of intrusion of the target vehicle into an expected driving lane of the vehicle driven in reverse based on the collected road information, wherein the collected road information comprises at least one of a type of lane boundary line located between the vehicle and the target vehicle and presence of a road structure between the vehicle and the target vehicle, and
   controlling the rear cross-traffic collision prevention function based on the probability of intrusion, in response to the vehicle being in reverse.

2. The method of claim 1, wherein the rear cross-traffic collision prevention function is activated based on the vehicle being in reverse (R) state.

3. The method of claim 1, wherein the at least one sensor comprise one or more of a rear side radar, a rear ultrasonic sensor, a rear side ultrasonic sensor, a rear camera sensor, and a side camera sensor installed in the rear or rear side of the vehicle.

4. The method of claim 1, wherein the collecting of the road information comprises determining a driving direction of the expected driving lane of the vehicle in reverse and a driving direction of a lane on which the target vehicle is traveling.

5. The method of claim 1, wherein the controlling of the rear cross-traffic collision prevention function comprises deactivating warning alerts and collision prevention control, in response to determining the target vehicle does not intrude into the expected driving lane of the vehicle based on the collected road information.

6. A rear warning system for a vehicle, the system comprising:
   at least one sensor configured to collect road information between the vehicle and a target vehicle present in a rear or rear side of the vehicle; and
   a collision prevention controller configured to
      collect, based on a rear cross-traffic collision prevention function being activated, road information between the vehicle and the target vehicle using the at least one sensor,
      determine a probability of intrusion of the target vehicle into an expected driving lane of the vehicle driven in reverse based on the collected road information, and
      control the rear cross-traffic collision prevention function based on the probability of intrusion, in response to the vehicle being in reverse,
      wherein the collision prevention controller is further configured to determine a driving direction of the expected driving lane of the vehicle in reverse and a driving direction of a lane on which the target vehicle is traveling.

7. The system of claim 6, wherein the collision prevention controller is further configured to activate, based on the vehicle being in a reverse (R) state, the rear collision prevention function.

8. The system of claim 6, wherein the at least one sensor comprise one or more of a rear side radar, a rear ultrasonic sensor, a rear side ultrasonic sensor, a rear camera sensor, and a side camera sensor installed in the rear or rear side of the vehicle.

9. The system of claim 6, wherein the collision prevention controller is further configured to determine a driving direction of the expected driving lane of the vehicle in reverse and a driving direction of a lane on which the target vehicle is traveling.

10. The method of claim 6, wherein the collision prevention controller is further configured to deactivate warning alerts and collision prevention control, in response to determining the target vehicle does not intrude into the expected driving lane of the vehicle based on the collected road information.

* * * * *